US011221833B1

(12) United States Patent
Huang

(10) Patent No.: US 11,221,833 B1
(45) Date of Patent: Jan. 11, 2022

(54) AUTOMATED OBJECT DETECTION FOR USER INTERFACE GENERATION

(71) Applicant: Amazon Technologies, Inc., Seattle, WA (US)

(72) Inventor: Willie H Huang, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/822,533

(22) Filed: Mar. 18, 2020

(51) Int. Cl.
G06F 9/451 (2018.01)
G06F 8/38 (2018.01)
G06K 9/46 (2006.01)
G06T 7/90 (2017.01)
G06T 7/60 (2017.01)
G06F 8/35 (2018.01)
G06N 20/00 (2019.01)
G06F 8/20 (2018.01)

(52) U.S. Cl.
CPC ............ G06F 8/38 (2013.01); G06F 8/20 (2013.01); G06F 8/35 (2013.01); G06F 9/451 (2018.02); G06K 9/46 (2013.01); G06N 20/00 (2019.01); G06T 7/60 (2013.01); G06T 7/90 (2017.01); G06K 2209/01 (2013.01)

(58) Field of Classification Search
CPC ..... G06F 8/38; G06F 8/35; G06F 8/20; G06F 9/451; G06N 20/00; G06T 7/60; G06T 7/90; G06K 9/46; G06K 2209/01
See application file for complete search history.

(56) References Cited

U.S. PATENT DOCUMENTS 10,489,126 B2 * 11/2019 Kumar ................. G06K 9/6218
10,877,735 B1 * 12/2020 Buck .......................... G06F 8/20
2007/0130529 A1 * 6/2007 Shrubsole ............... G06F 9/451
715/762

(Continued)

FOREIGN PATENT DOCUMENTS

CN 110968299 A * 4/2020
KR 20190119686 A * 10/2019

OTHER PUBLICATIONS

Fronty—Convert image into HTML/CSS powered by AI (retrieved from https://www.youtube.com/watch?v=MDcvhvBHPxo), Apr. 12, 2019, 1 page (Year: 2019).*

(Continued)

Primary Examiner — Yongjia Pan
(74) Attorney, Agent, or Firm — Lowenstein Sandler LLP

(57) ABSTRACT

A method for automated object detection for user interface generation includes receiving an image depicting a layout of a user interface for an application; analyzing the image to detect an object in the image, where the object depicts a representation of a portion of the layout of the user interface, and where the object is associated with a portion of textual content in the image; determining a set of attributes for the object, the set of attributes pertaining to the position of the object within the layout of the user interface; determining a user interface functionality associated with the portion of textual content; and generating application code for an executable user interface for the application, where the application code is to provide a user interface component based on the set of attributes that performs the user interface functionality.

20 Claims, 11 Drawing Sheets

(56) References Cited

U.S. PATENT DOCUMENTS

| | | | | |
|---|---|---|---|---|
| 2008/0046868 | A1* | 2/2008 | Tsantilis | G06F 8/36 |
| | | | | 717/136 |
| 2012/0166978 | A1* | 6/2012 | Singh | G06F 8/51 |
| | | | | 715/762 |
| 2012/0198368 | A1* | 8/2012 | Bornheimer | G06F 8/77 |
| | | | | 715/763 |
| 2016/0034441 | A1* | 2/2016 | Nguyen | G06F 40/137 |
| | | | | 715/234 |
| 2017/0277518 | A1* | 9/2017 | Krishnan | G06F 8/34 |
| 2018/0203674 | A1* | 7/2018 | Dayanandan | G06F 9/451 |
| 2018/0349730 | A1* | 12/2018 | Dixon | G06K 9/6262 |
| 2019/0250891 | A1* | 8/2019 | Kumar | G06F 8/34 |
| 2019/0317739 | A1* | 10/2019 | Turek | G06F 40/14 |
| 2020/0134388 | A1* | 4/2020 | Rohde | G06F 8/38 |
| 2020/0183664 | A1* | 6/2020 | Lee | G06F 8/31 |
| 2021/0011592 | A1* | 1/2021 | Liu | G06F 8/38 |
| 2021/0150263 | A1* | 5/2021 | Corwin | G06F 40/186 |

OTHER PUBLICATIONS

Tara Jana, Turn your whiteboard sketches to working code in seconds with Sketch2Code (retrieved from https://azure.microsoft.com/en-us/blog/turn-your-whiteboard-sketches-to-working-code-in-seconds-with-sketch2code/), Aug. 27, 2018, 4 pages (Year: 2018).*

AI in Front-End. Do We Really Need It? (retrieved from https://www.simplexco.de/posts/ai-in-frontend/), Apr. 18, 2019, 9 pages (Year: 2019).*

Tony Beltramelli, pix2code: Generating Code from a Graphical User Interface Screenshot (retrieved from https://arxiv.org/pdf/1705.07962.pdf), Sep. 19, 2017, 9 pages (Year: 2017).*

Pix2code.py (retrieved from https://github.com/tonybeltramelli/pix2code/blob/eab4816e397e7491b92bdcb78d9d7195afa412b3/model/classes/model/pix2code.py#L14), Oct. 2, 2017, 4 pages (Year: 2017).*

Xinyu Zhou, Cong Yao, He Wen, Yuzhi Wang, Shuchang Zhou, Weiran He, and Jiajun Liang, EAST: An Efficient and Accurate Scene Text Detector (retrieved from https://arxiv.org/pdf/1704.03155.pdf), Jul. 10, 2017, 10 pages (Year: 2017).*

Alexander Robinson, sketch2code: Generating a website from a paper mockup (retrieved from https://arxiv.org/pdf/1905.13750.pdf), May 2018, 64 pages (Year: 2018).*

Tuan Anh Nguyen, Christoph Csallner, Reverse Engineering Mobile Application User Interfaces With REMAUI (retrieved from https://ieeexplore.ieee.org/stamp/stamp.jsp?tp=&arnumber=7372013), 2015, 12 pages (Year: 2015).*

Siva Natarajan, Christoph Csallner, P2A: A Tool for Converting Pixels to Animated Mobile Application User Interfaces (retrieved from https://ieeexplore.ieee.org/stamp/stamp.jsp?tp=&arnumber=8543458), 2018, 12 pages (Year: 2018).*

Xiaofei Ge, Android GUI Search Using Hand-drawn Sketches (retrieved from https://ieeexplore.ieee.org/stamp/stamp.jsp?tp=&arnumber=8802661), 2019, 3 pages (Year: 2019).*

Farnaz Behrang, Steven P. Reiss, Alessandro Orso, GUIFetch: Supporting App Design and Development through GUI Search (retrieved from https://ieeexplore.ieee.org/stamp/stamp.jsp?tp=&arnumber=8543459), 2018, 11 pages (Year: 2018).*

Vanita Jain, Piyush Agrawal, Subham Banga, Rishabh Kapoor and Shashwat Gulyani , Sketch2Code: Transformation of Sketches to UI in Real-time Using Deep Neural Network (retrieved from https://arxiv.org/pdf/1910.08930.pdf), Oct. 20, 2019, 15 pages (Year: 2019).*

\* cited by examiner

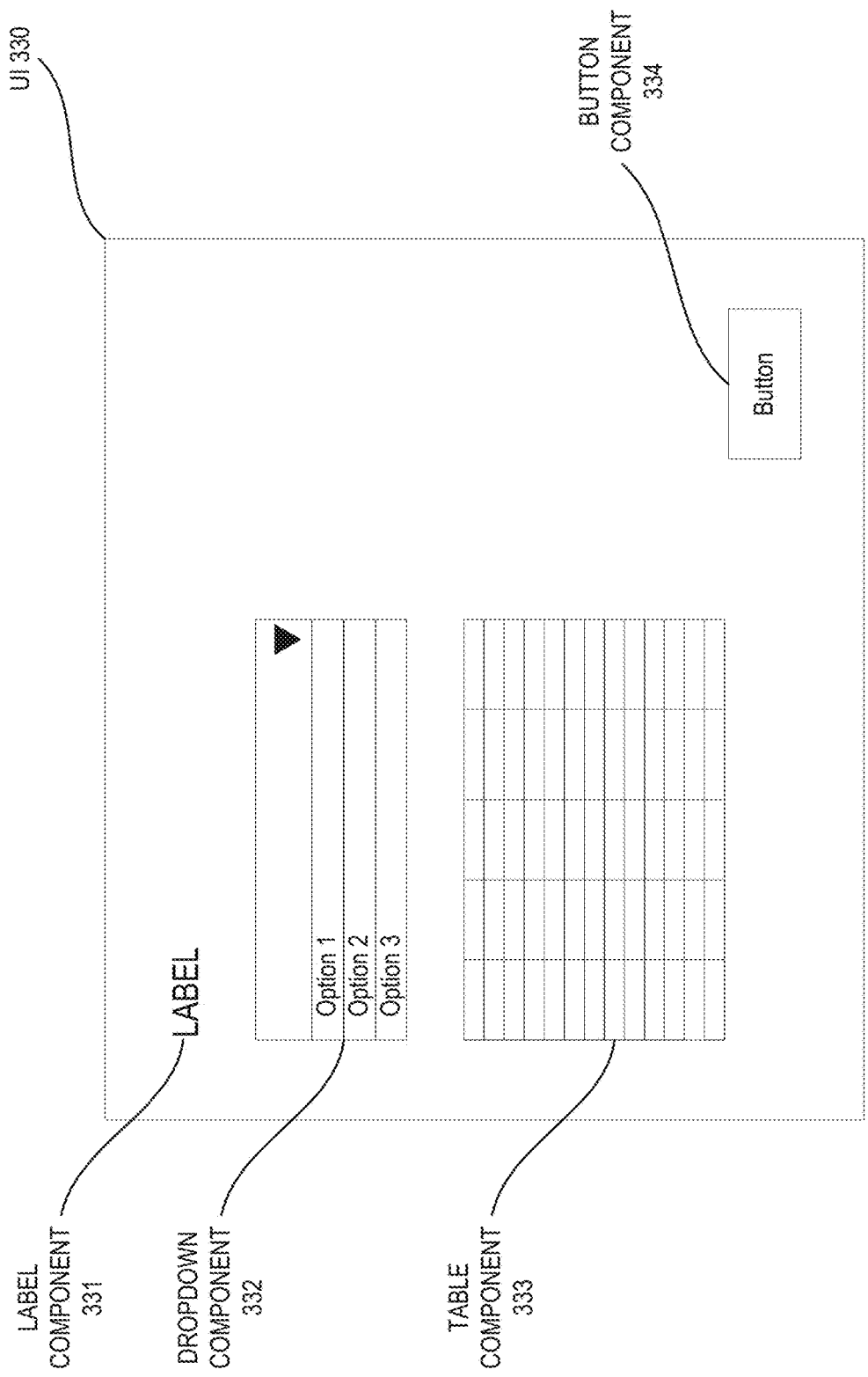

AUTOMATED OBJECT DETECTION FOR USER INTERFACE GENERATION

BACKGROUND

The software development lifecycle for the development of many application user interface projects often involves multiple iterative stages that can involve multiple development groups. In such environments, a single project can often involve a project/product manager (PM), a user experience (UX) designer, and multiple back end engineering groups for the development of a single application. During a typical product design and development lifecycle, the PM would initiate a product idea and work closely with UX designers and engineers to deliver the application for user testing and feedback. The cycle can often loop between the participants multiple times until a prototype application user interface (UI) has been developed that is sufficient to achieve a business goal or to demonstrate to an end user or customer.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIG. 3C depicts an example of a generated user interface, in accordance with one embodiment of the present disclosure.

DETAILED DESCRIPTION

Figure 1:
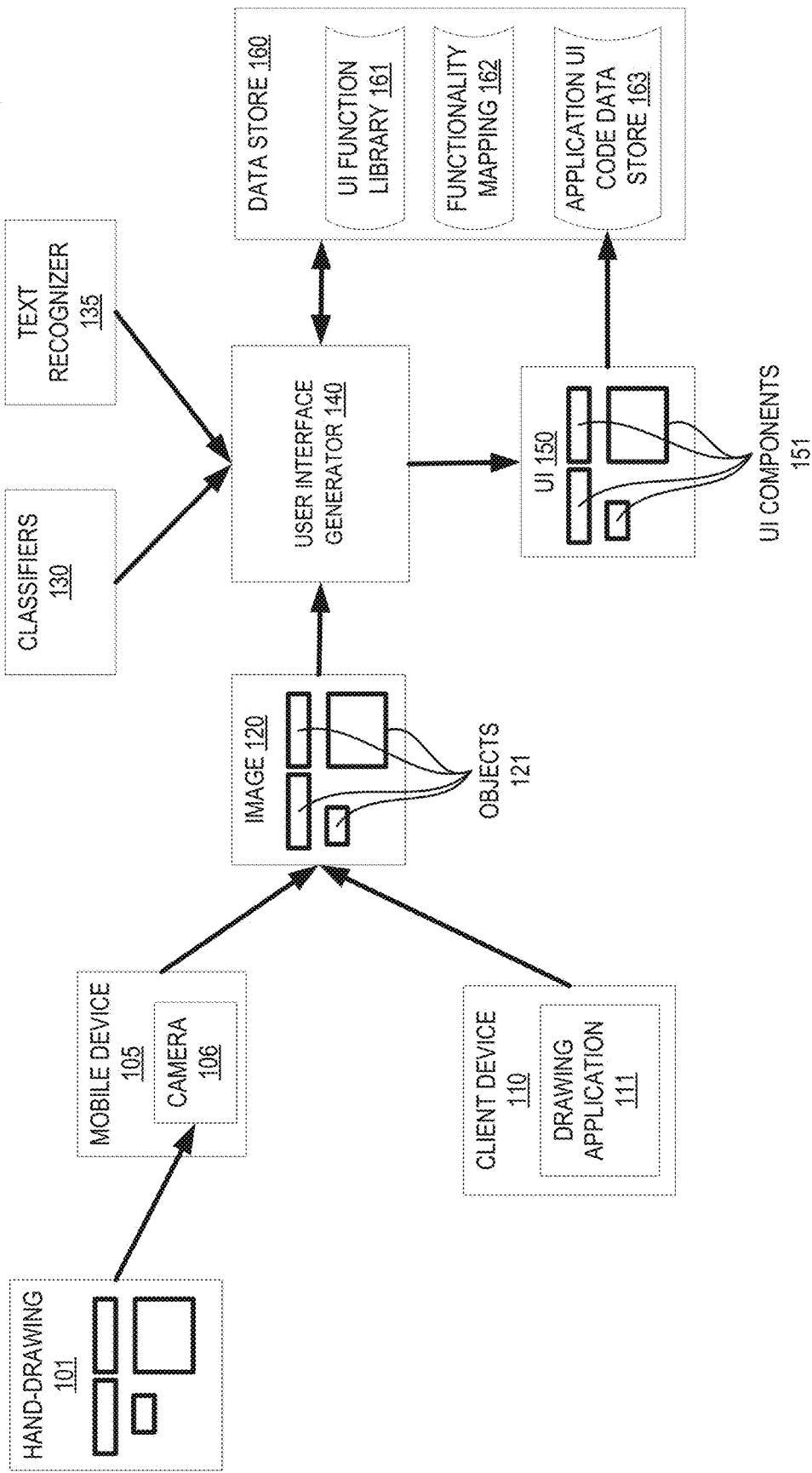
FIG. 1 illustrates an example network architecture that includes a user interface generator, according to embodiments of the present disclosure.

Embodiments described herein relate to providing automated object detection for user interface generation. A typical application development cycle can often begin with a PM developing an initial concept for an application by producing a hand-drawn sketch or digital drawing of a layout for an application user interface. The PM would then provide that sketch to a UX developer who would produce an initial a visual representation of a user interface to define the hierarchy of items on a screen and communicate what the items on that page should be based on user needs (e.g., a UI "wireframe"). Once the PM has approved the wireframe, they may pass implementation requirements along with the wireframe to front end and/or back end application engineers who construct a prototype application (e.g., "demo") to provide to business users and/or customers. The PM can provide feedback and/or updates to the UX designer and application engineers who can revise the application components and return to the PM.

Conventional software development systems employed in this fashion typically involve multiple iterations that provide multiple revised application versions before the PM provides a demonstration of the application to an end user or customer. In such instances, the overall development cycle costs can increase dramatically. Additionally, frequent iterative changes to the application code can often result in increased risk of introducing coding errors, which can further increase costs and extend development delivery timelines. Moreover, even a simple user interface prototype can often involve additional groups that may not necessarily need to be involved at the initial stages of the development process. For example, the front and back end application code provided by additional engineering groups might not be needed when a proof of concept application is to be provided to a customer or end user. In such cases, a simpler prototype can be initially developed and after customer approval is provided, the engineering groups can become involved. To involve these groups earlier than necessary can lead to additional costs and delays, particularly if the prototype application is not approved by the customer or end user in its initial form.

Some conventional software development systems address these issues by implementing a form of object detection to generate prototype application UIs based on an image that depicts a UI layout. In conventional implementations, these systems rely on the use of specific symbology to denote particular user interface components to be used in a prototype application UI. If a PM fails to utilize the correct symbol in the provided image, the layout may not be analyzed correctly, thus failing to provide the expected results. As such, these implementations are often inefficient and inflexible, resulting in increased costs to implement across a user base.

Aspects of the present disclosure address the above noted and other deficiencies by implementing a user interface generator to facilitate automated object detection for user interface generation. The user interface generator can receive an image depicting a layout of a user interface for an application. In various embodiments, the image can be a photograph of hand-drawn user interface components, output of a drawing application, or the like. The user interface generator can detect the drawn objects in the image to determine the positional attributes for each object and generate code to provide UI components that are of the approximate size, shape, and location of those depicted. Additionally, the user interface generator can be configured to analyze text included in the image that describes the category or functionality of each of the depicted UI components. The user interface generator can then determine the functionality of the detected object based on the associated text and generate code to provide that functionality. An application UI prototype can then be generated that provides UI functionality that corresponds to that depicted in the received image.

Aspects of the present disclosure present advantages over conventional solutions to the issues noted above. First, the user interface generator can provide base application UI code without involving additional engineering groups. This can significantly reduce costs in the early stages of application development since multiple engineering groups need not be immediately involved in the process. Additionally, the user interface generator can produce base application code for the UI components that can be utilized by the engineering teams later in the development process, which can reduce costs both in terms of developer effort and overall timeline to delivery. Moreover, since the user interface generator can be configured to recognize text rather than specific symbology, the learning curve can be significantly shortened, which can significantly reduce implementation costs. Further, the user interface generator is significantly more flexible than conventional implementations, since it determines UI component functionality based on recognized text. Thus, support for new UI components can be implemented without involving modifications to the process.

FIG. 1 illustrates an development environment architecture 100 that includes a user interface generator 140, according to embodiments of the present disclosure. In various implementations, the user interface generator 140 may be a component of a server device (not pictured), a cloud computing environment (not pictured), or the like. User interface generator 140 can be configured to receive an image 120 that depicts the layout of an application user interface. In various implementations, user interface generator 140 can receive image 120 from a mobile device 105 that includes a camera 106, a client device 110 that includes a drawing application 111, or other similar device or system.

Communication between the user interface generator 140 and the mobile device 105 and/or client device 110 may be enabled via any communication infrastructure, such as public and private networks. One example of such an infrastructure includes a combination of a wide area network (WAN) and wireless infrastructure, which allows a user to use mobile device 105 and/or client device 110 to interact with user interface generator 140 without being tethered to a server system or cloud computing environment via hardwired links. The wireless infrastructure may be provided by one or multiple wireless communications systems. One of the wireless communication systems may be a Wi-Fi access point connected a network. Another of the wireless communication systems may be a wireless carrier system that can be implemented using various data processing equipment, communication towers, etc. Alternatively, or in addition, the wireless carrier system may rely on satellite technology to exchange information with mobile device 105 and/or client device 110.

Mobile device 105 and/or client device 110 are representative of any number of stationary or mobile computers such as desktop personal computers (PCs), servers, server farms, workstations, laptops, handheld computers, servers, personal digital assistants (PDAs), smart phones, game consoles and so forth. It is noted that some systems may include only a single client device, connected directly or remotely, to the system hosting the user interface generator.

As noted above, user interface generator 140 can be configured to receive an image 120 that depicts the layout of an application user interface. In some implementations, the image 120 can be received from mobile device 105 that includes a camera 106. In such instances, camera 106 of mobile device 105 can be used to capture an image of hand-drawing 101 which may be a drawing on paper, on a whiteboard, or the like. An example of a hand-drawing 101 is described below with respect to FIG. 3A. In various implementations, the hand-drawing 101 may depict a sketch of a prototype user interface that includes objects that are representative of different components of the prototype user interface. For example, an object that represents a button component of a user interface may be depicted as a square or rectangular box with the word "button" written within the boundaries of the object or in close proximity (e.g., within a threshold distance) to the object. Similarly, an object that represents a dropdown list of a user interface may be depicted as a rectangular box with the word "dropdown" written within the boundaries of the object or in close proximity to the object. Other objects may be included in the hand-drawing that are similarly labeled to represent other components of the user interface (e.g., label, card, table, search bar, message display, etc.).

In some implementations, image 120 may be received from a client device 110 that includes a drawing application 111. In such instances, the drawing application 111 may be an application that provides the ability to draw and label objects representative of a prototype user interface for an application. For example, drawing application may be a paint application, an architectural drawing application, a flowcharting application, a photo editing application, or the like.

As noted above, image 120 may depict an image of a user interface for an application. Image 120 may be a photograph of hand-drawing 101, a digital drawing from drawing application 111, or the like. Image 120 may include multiple objects 121 that correspond to the objects drawn in the hand-drawing 101 or a digital drawing produced by drawing application 111. As noted above, the objects represent the various component of the prototype application user interface.

In some implementations, user interface generator 140 may receive image 120 from mobile device 105 and/or client device 110 over a network connection (not pictured). Alternatively, image 102 may be stored in data store 160 by mobile device 105 and/or client device 110 for later retrieval by user interface generator 140. In other implementations, user interface generator 140 may execute on the same machine or cloud service that captures or produces the mobile image 120. In such instances the image 120 may be stored in a memory for retrieval by user interface generator 140.

User interface generator 140 can analyze the image 120 to detect the objects 121. In some implementations, user interface generator 140 can utilize classifiers 130 to detect the objects by analyzing the patterns depicted by the objects 121. The classifiers 130 can be trained to recognize different types of shapes and structures that represent different types of components in a user interface. In some implementations, user interface generator 140 can identify the dark and light pixels in the image 120 in order to identify the various objects 121. User interface generator 140 can then determine a set of attributes for the object, where the set of attributes are indicative of the size, shape, and position of the object within the layout depicted in image 120.

User interface generator 140 can identify textual content associated with each of the objects 121. As noted above, image 120 may include text associated with each of the objects 121 that describe the category and/or functionality of that object. In some implementations, user interface generator 140 can utilize classifiers 130 that are trained to recognize the pattern of text associated with known user interface functionalities. For example, classifiers 130 can be trained to recognize that the pattern of printed or written text for the word "button" represents a button user interface control functionality. Similarly, classifiers 130 can be trained to recognize the pattern of other printed or written text for other words associated with user interface functionalities (e.g., dropdown, label, card, table, search bar, message display, etc.).

In some implementations, user interface generator 140 can recognize the text associated with the objects 121 by executing a text recognition process (e.g., text recognizer 135). In various implementations, the text recognizer 135 can execute the text recognition process by performing an optical character recognition (OCR) operation, execute a model trained to generate text based on the shape of the portion of textual content (e.g., machine learning model, artificial intelligence model, neural network model, deep learning network model, or the like). In such instances, user interface generator 140 can determine a text string that is associated with an object (either within the boundaries of the object or within a threshold distance from the object) and determine the functionality for that object by accessing a mapping table that maps strings to known functionalities (e.g., functionality mapping 162). In such instances, user interface generator 140 can provide additional flexibility to support new user interface functionalities without retraining classifiers 130. For example, if a new type of button functionality is added to the development environment architecture 100, a mapping table entry can be added to functionality mapping 162 that maps a new text string (e.g., "newbutton") to a reference to a user interface control element that performs that new functionality.

Subsequently, user interface generator 140 can generate application code for an executable user interface 150 for the application. In some implementations, the application code is to provide user interface components 151 for each of the identified objects 121 depicted in image 120. User interface generator 140 can generate the application code to generate the user interface components 151 in the layout for user interface 150 based on the identified attributes for each object 121. For example, if user interface generator 140 identifies an object 121 with attributes that indicate a rectangular shape in the upper left corner of the layout, application code can be generated to present a component 151 in user interface 150 that displays a rectangular component in the upper left corner of the screen. In some implementations, user interface generator 140 can generate the application code based on the attributes by generating hypertext markup language (HTML) to present that component 151 within user interface 150.

User interface generator 140 can additionally generate additional application code for the component 151 to perform the identified functionality. Once the functionality has been identified, user interface generator 140 can access a user interface function library (e.g., UI function library 161) to retrieve application code that performs the functionality, and add that to the application code for the user interface 150. For example, if user interface generator 140 determines that an object is a button based on the analysis of the associated text in the image 120, user interface generator 140 can access UI function library 161 to retrieve application code that can be used to perform functions typically associated with a button user interface component. In such instances, user interface generator 140 can retrieve scripting code (e.g., JavaScript) that performs detects different events associated with clicking a button control in user interface 150 (e.g., an "onclick" event). User interface generator 140 can associate the functionality code with the attribute code to create a combined application code segment for that user interface component 151. In various implementations, UI function library 161 can store application code for a particular UI or UX framework (e.g., Google Material Design, Amazon Polaris Design, Microsoft Metro Design, Apple iOS and/or MacOS Human Interface Design, or other UI/UX Design frameworks). Additionally, UI function library 161 can represent one or more different UI function libraries that can be added or removed to data store 160 to customize the capabilities of user interface generator 140 without the need to rebuild or reconfigure the system.

Once each object 121 has been identified and application code for the corresponding user interface component 151 has been generated, user interface generator? 140 can then store the executable user interface 150 in application UI code data store 163 for later execution and/or download.

User interface generator 140 is described in additional detail below with respect to FIG. 2.

Figure 2:
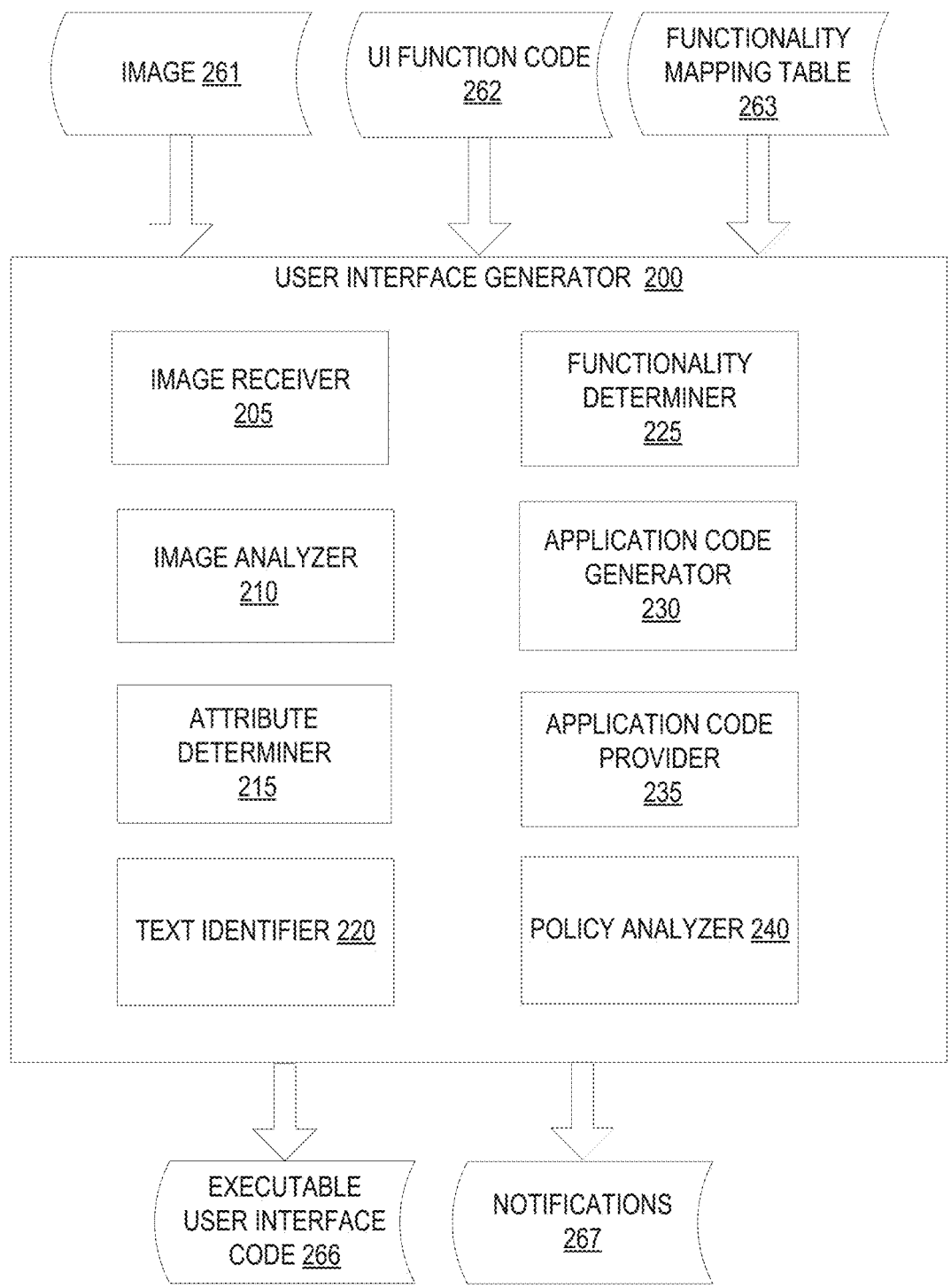
FIG. 2 is a block diagram of a logical view of a user interface generator, in accordance with one embodiment of the present disclosure.

FIG. 2 is a block diagram of a logical view of a user interface generator 200, in accordance with one embodiment of the present disclosure. User interface generator 200 may correspond to the user interface generator 140 of FIG. 1. In some embodiments, user interface generator 200 can include image receiver 205, image analyzer 210, attribute determiner 215, text identifier 220, functionality determiner 225, application code generator 230, application code provider 235, and policy analyzer 240. Alternatively, the functionality of one or more of image receiver 205, image analyzer 210, attribute determiner 215, text identifier 220, functionality determiner 225, application code generator 230, application code provider 235, and policy analyzer 240 can be combined into a single module or divided into multiple sub-modules.

Image receiver 205 is responsible for receiving an image depicting a layout of a user interface for an application (e.g., image 261). As noted above, the image can be received from a device with a camera (e.g., a mobile device, laptop computer, digital camera, etc.), a device executing a drawing application (e.g., desktop computer, laptop computer, tablet device, etc.), or the like. Also, as noted above, the image can be a photograph of a hand-drawing (e.g., an image drawn on paper, a whiteboard, a chalkboard, etc.), a digital image created by a drawing program, a digital image created by a user that uses a stylus on a computer or tablet, or the like. In various implementations, the image can include objects that each represent a component of a prototype user interface design for an application (e.g., a web-based application, a desktop application, a mobile application, etc.). The image can be created such that each object includes a text description for that object that describes the category or UI functionality to be performed by the UI component represented by that object. In some implementations, the text can be included within the boundaries of the object. Alternatively, the text can be in close proximity (e.g., within a threshold distance) to the object to which it is associated. For example, an object represented as a button can be depicted as a square or rectangular box with the text "button" written or typed inside of the box (or within a threshold distance of the box).

In some implementations, image receiver 205 can receive the image 261 from a device over a network connection (e.g., provided by a device over a wireless connection, internet connection, etc.) that couples the device to the development architecture executing user interface generator 200 (e.g., a cloud computing environment, server system, network connected development workstation, etc.). Alternatively, image receiver 205 can receive the image 261 by retrieving it from a data store.

Image analyzer 210 is responsible for analyzing image 261 to detect objects in the image. As noted above, each object can depict a representation of a portion of the layout of a user interface for an application. Additionally, each object can be associated with a portion of textual content included in the image. As noted above, the text can be included within the boundaries of the drawn object, or in close proximity to the object. In various implementations, image analyzer 210 can execute image detection logic to identify the boundaries of each object in the image. In some instances, image analyzer 210 can perform this detection by examining the dark and light pixels in the image.

Attribute determiner 215 is responsible for determining a set of attributes for the object. In various implementations, the set of attributes can pertain to the position and structure of the object within the layout of the user interface. For example, the attributes can describe the size, shape, and location of the object within the layout. In some implementations, attribute determiner 215 can determine the attributes of an object by determining a set of boundary coordinates for that object. Attribute determiner 215 can determine a set of horizontal coordinates and a set of vertical coordinates (e.g., coordinates with respect to an x-axis and y-axis) for the image within the layout and derive the boundary coordinates based on the horizontal and vertical coordinates. For example, after analyzing an object that has been drawn in the shape of a square (e.g., representing a button of the UI), attribute determiner 215 can determine the coordinate values for each corner of that square within the image layout.

Subsequently, attribute determiner 215 can use the boundary coordinates to determine the shape of the object, the size of the object, and/or the location of the object within the layout of the UI in the image. In some implementations, attribute determiner 215 can make these determinations by identifying the maximum and minimum coordinate values in both the horizontal and vertical planes to identify the shape of the object. For example, a hand-drawing of a square may often include crooked lines and corner vertices that do not line up at 90 degree angles. Attribute determiner 215 can identify the coordinates of each of the corners of the hand-drawn object, and subsequently determine the largest vertical coordinate value (y-axis coordinate value) for the top vertices and the lowest vertical coordinate value for the bottom vertices. Attribute determiner 215 can perform a similar determination for the horizontal coordinate values (x-axis value) of the object by identifying the largest horizontal coordinate value for the right-most vertices and the lowest horizontal value for the left-most vertices of the object. Attribute determiner 215 can then determine the approximate shape of the object by constructing horizontal and vertical bounding lines based on the maximum and minimum coordinate values.

In some implementations, attribute determiner 215 can analyze the object in the image to determine its color. In such instances, attribute determiner 215 can set a color attribute of the user interface component for the object based on the detected color. For example, the color attribute may be used to indicate the color of the user interface component as it is displayed in the user interface during application execution (e.g., a button can be displayed on a screen in a particular color). Alternatively, the color may be associated with a particular user interface component functionality. In such instances, the functionality for the resulting user interface component can be assigned at least in part on the color. For example, an object in the image that is drawn as a rectangle may be intended to be used to display error messages. The object may be depicted in a particular color to indicate that the contents of the message box should be highlighted in a particular color during application execution. Similarly, a button object drawn in a particular color can indicate that along with the typical functionality for a button component, the color can specify a particular functionality to be performed when clicking on the button within the user interface.

Text identifier 220 is responsible for identifying textual content associated with the objects in image 261. As noted above, each object may be associated with text that describes the category or functionality of that object. For example, a hand-drawn square or rectangle can include the text "button" inside of the boundaries of the object to denote that the object represents a user interface button component. Alternatively, the text can be written in close proximity to the object. For example, the text "button" can be depicted immediately above, below, or to either side of the object within the image. Thus, for small objects, the descriptive text can be associated with the object when the text may not be able to fit within the object as depicted in the image. Examples of text included inside of drawn objects are included below with respect to FIGS. 3A-3C.

Functionality determiner 225 is responsible for determining a user interface component functionality associated with the text content identified by text identifier 220. In some implementations, functionality determiner 225 can make this determination by analyzing the identified text using machine learning classifiers that are trained to recognize a pattern associated with the identified text (e.g., classifiers 130 of FIG. 1). As noted above, the classifiers can be trained using images that depict the shape of different ways of writing keywords associated with user interface component functionalities (e.g., "button", "dropdown", "table", "label", etc.). The trained classifier(s) can then determine the functionality associated with drawn object based on the pattern recognized by the classifier(s). In some implementations, multiple classifiers may be used, where each classifier has been trained to recognize the patterns of a text for a particular functionality. Alternatively, a single classifier can be used to recognize patterns for multiple different functionalities. In various implementations, the classifiers can be any type of machine learning classifier, neural network classifier, a recurrent neural network classifier, artificial intelligence classifier, or the like.

In some implementations, functionality determiner 225 can determine the functionality for the component by executing a text recognition process (e.g., text recognizer 135 of FIG. 1). In various implementations, functionality determiner 225 can perform an optical character recognition (OCR) operation, execute a model trained to generate text based on the shape of the portion of textual content (e.g., machine learning model, artificial intelligence model, neural network model, deep learning network model, or the like). For example, functionality determiner 225 can perform the text recognition operation (e.g., an OCR operation) on the textual content associated with the object to generate a text string for that textual content. Subsequently, functionality determiner 225 can determine the functionality by accessing a mapping table that maps text strings to associated functionalities (e.g., functionality mapping table 263). For example, functionality determiner 225 can perform an OCR operation (or other type of text recognition operation) on textual content in image 261 to generate a text string "button", and access functionality mapping table 263 to identify a user interface functionality associated with the text string "button". In various implementations, when new functionalities are created for new types of user interface components, an entry can be created in mapping table 263 to facilitate functionality determination without involving additional logic or retraining of classifiers.

Application code generator 230 is responsible for generating application code for an executable user interface (e.g., executable user interface code 266). In various implementations, the application code is to provide a user interface component based on the set of attributes identified by attribute determiner 215. Additionally, the application code is to perform the functionality identified by functionality determiner 225.

In some implementations, application code generator 230 can be invoked by attribute determiner 215 to generate a first portion of application code that provides the user interface component for the object based on the determined attributes of the object. In such instances, once attribute determiner 215 determines the size, shape, location, color, or other attributes for the object, application code generator 230 can generate the code for the corresponding user interface component so that it is presented in the user interface with the appropriate size, shape, location or color. For example, once the boundary coordinates have been determined for an object, the application code can be generated to display that object using those coordinates. Thus, if the object has been determined to be a square, the application code to construct a visual representation of the square within the user interface can be generated. In an illustrative example, application code generator 230 can generate the application code needed to display the square using the determined coordinate values. Similarly, the location of the object within the image layout can be determined and the code can be generated so that that square is displayed in the proper location based on the location attributes of the associated object in the image. In various implementations, the application code can include hypertext markup language (HTML) code or JavaScript for web applications, higher level application programming language code for mobile or desktop applications (e.g., C, C++, Java, Python, C#, etc.), or the like.

Application code generator 230 can also be invoked by functionality determiner 225 to generate the application code to perform the identified user interface functionality for the user interface component. In such instances, application code generator 230 can receive the identified functionality and retrieve stored code associated with that functionality from a library of user interface function code (e.g., UI function code 262). For example, if functionality determiner 225 determines that the category/functionality of an identified object is a button, application code generator 230 can access UI function code 262 to retrieve template application code to perform the button functionality within the user interface (e.g., application code to configure an "onclick" event for the button). Similarly, if the functionality is determined to be a dropdown, application code generator 230 can retrieve template application code to perform that functionality (e.g., application code to configure a "select" event).

Application code generator 230 can subsequently associate the attribute code with the functionality code to generate a combined application code segment for the user interface component within the layout provided by the executable user interface of the application. For example, the HTML code that describes the layout and location of a button can be updated to include JavaScript code to provide the functionality of the button. Similarly, the HTML code for a dropdown component can be updated to include JavaScript code to provide the dropdown functionality. Application code generator 230 can repeat the process for each identified object in the image to generate application code for the corresponding user interface components and combine the code for all components to generate the code for the application user interface (e.g., executable user interface code 266).

Application code provider 235 is responsible for managing the generated code for the application user interface. In some implementations, application code provider 235 can store the generated code in a data store for later retrieval by a user. In such instances, application code provider 235 can generate a unique identifier (e.g., a universally unique identifier (UUID)) for the application code and store the application code in the data store so that it is associated with the unique identifier. Additionally, or alternatively, application code provider 235 can provide the application code to a client device for execution. In some implementations, a client device that provides the initial image to be analyzed can include a request to receive the resulting code. In such instances, application code provider 235 can provide the generated code to the requesting client device to be executed or stored on that device.

Policy analyzer 240 is responsible for analyzing the application code generated by application code generator 230 and comparing the code against user interface design policies. In some implementations, a user interface design policy can include rules pertaining to user interface attributes or user interface component functionality established by the application development organization. For example, a policy can specify that a button should be square rather than circular or rectangular. Similarly, a policy can specify that a message box should be at the top of a user interface layout rather than at the bottom or in another location. In other instances, a policy can specify that particular user interface component should not be in close proximity to each other. For example, a policy may specify that a single user interface screen should not include multiple buttons in a row.

In various implementations, policy analyzer 240 can retrieve policy rules and examine the generated code based on the retrieved rules. Policy analyzer 240 can then determine whether the generated application code violates any of the retrieved policy rules and, if so, perform an action based on the policy violation. For example, policy analyzer 240 can provide an alert notification (e.g., notifications 267) to the requesting user. The alert notification can be an error message provided by user interface generator 200 that the user can receive in real time. Alternatively, the alert can be in the form of a message received via email, text message, or in a log file that is generated by user interface generator 200. In other implementations, policy analyzer 240 can modify the generated application code to change the location of a user interface component to conform with the policy. For example, if the policy dictates that a message box should be at the top of the user interface and the generated code includes a message box in another location, policy analyzer 240 can modify the generated code to relocate the message box to conform with the policy rules. In other implementations, policy analyzer 240 can modify the generated code to highlight the component that violates the rule (e.g., change the displayed color) and display an error message within the user interface (or in a log file) rather than modify the code to relocate the component.

Figure 3A:
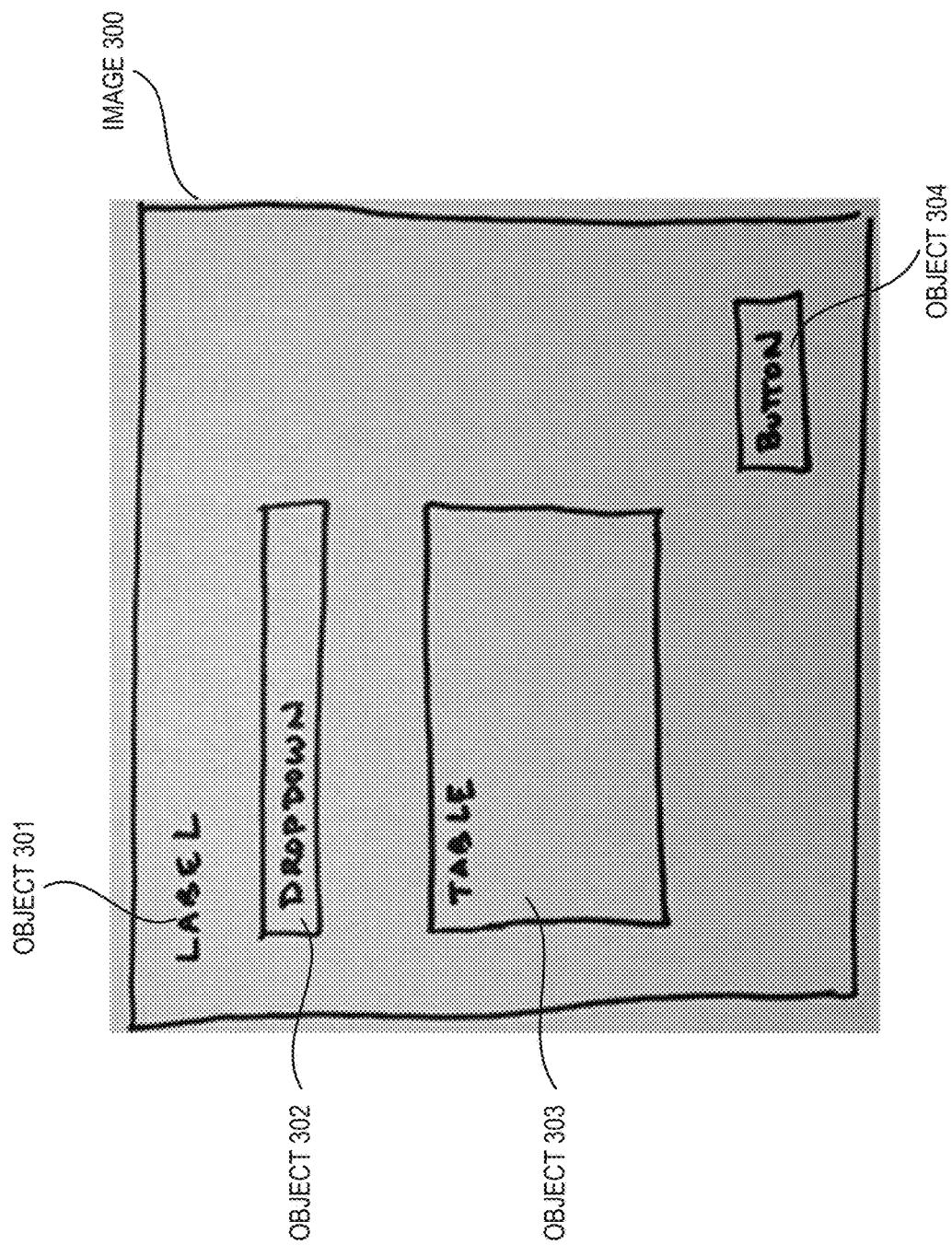
FIG. 3A depicts an example of an image of a hand-drawing that depicts a user interface layout, in accordance with one embodiment of the present disclosure.

FIG. 3A depicts an example of an image 300 of a hand-drawing that depicts a user interface layout, in accordance with one embodiment of the present disclosure. As shown in FIG. 3A, image 300 includes objects 301, 302, 303, and 304 that depict components of a prototype user interface for an application. Object 301 depicts a label and is represented by the hand-drawn text content "LABEL". Object 302 depicts an object for a dropdown, and is represented by a hand-drawn rectangle that surrounds the hand-drawn text content "DROPDOWN". Object 303 depicts an object for a table, and is represented by a hand-drawn large box that surrounds the hand-drawn text content "TABLE". Object 304 depicts an object for a button, and is represented by a hand-drawn small rectangle that surrounds the hand-drawn text content "BUTTON". While FIG. 3A depicts an image with particular objects to represent particular components of a particular user interface prototype, in other implementations, aspects of the present disclosure can be applied to various other images that include other types of objects for other categories of user interface components.

Figure 3B:
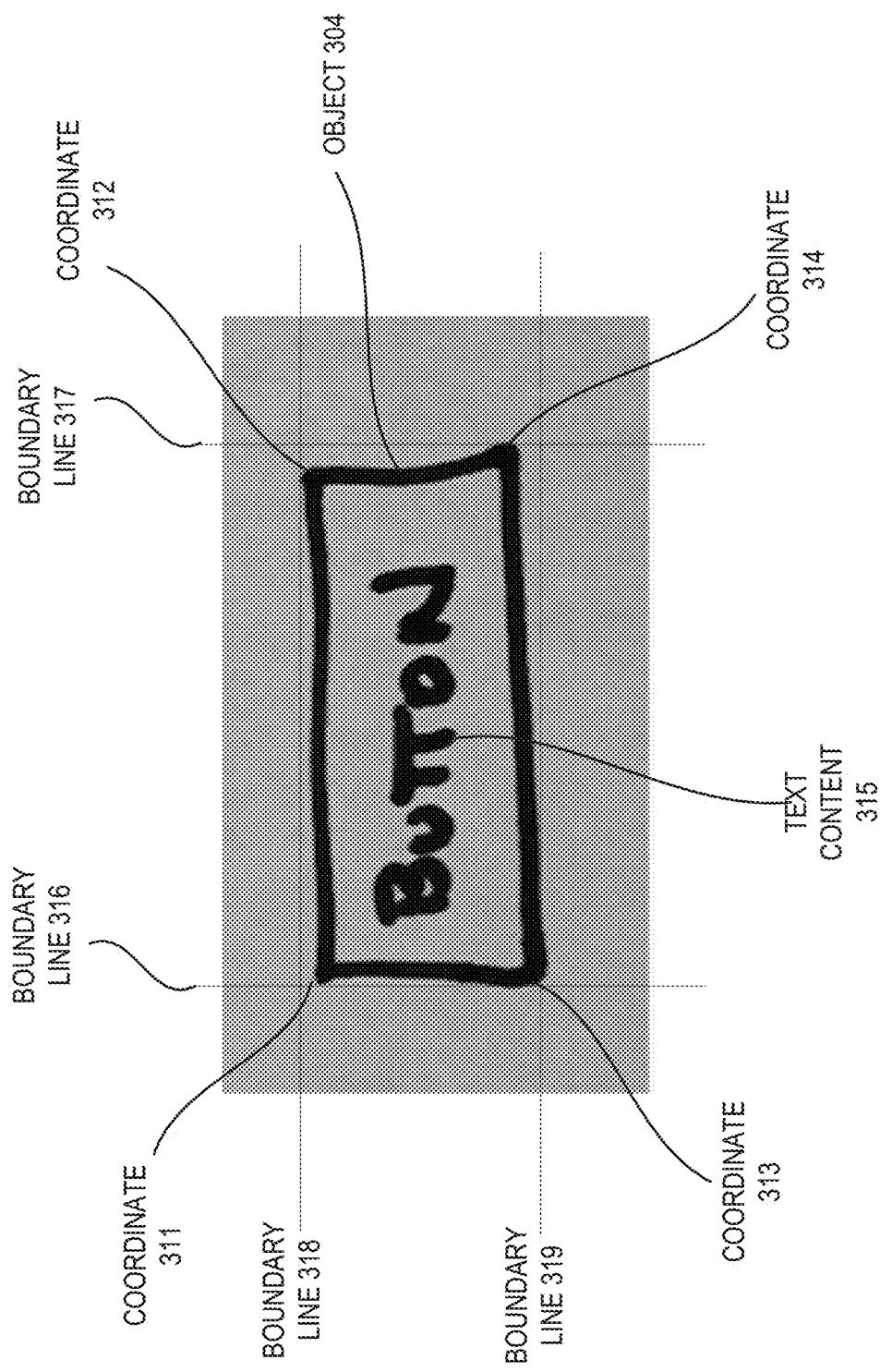
FIG. 3B depicts an example of a hand-drawn object within an image, in accordance with one embodiment of the present disclosure.

FIG. 3B depicts an example of an object 304 within image 300 of FIG. 3A. As shown in FIG. 3B, the object 304 depicts a hand-drawn button object. In various implementations, the user interface generator of the present disclosure can analyze object 304 to detect the coordinates of the corners of the object (coordinates 311, 312, 313, and 314) as well as the text content 315 that depicts the word "BUTTON". As with many hand-drawings, the edges of the button are uneven and the vertices of the corners are not aligned. The user interface generator can analyze the coordinates 311-314 to identify boundary lines 316, 317, 318 and 319 based on the maximum and minimum coordinate values so that a geometric shape for the object can be generated to represent the user interface control.

As shown, since coordinate 312 has a greater vertical coordinate (greater y-axis coordinate value) than coordinate 311, upper boundary line 318 can be constructed using the vertical coordinate value of coordinate 312. Similarly, since coordinate 313 has a lesser vertical coordinate (lesser y-axis coordinate value) than coordinate 314, the lower boundary line 319 can be constructed using the vertical coordinate value of coordinate 313. Additionally, since coordinate 313 has a lesser horizontal coordinate (lesser x-axis coordinate value) than coordinate 311, the left boundary line 316 can be constructed using the horizontal coordinate value of coordinate 313. Similarly, since coordinate 314 has a greater horizontal coordinate (lesser x-axis coordinate value) than coordinate 312, the right boundary line 317 can be constructed using the horizontal coordinate value of coordinate 314. Subsequently, boundary lines 316-319 can be used to construct the application code to display a geometric rectangle within the resulting user interface.

FIG. 3C depicts an example of a generated user interface 330 based on the image 300 of FIG. 3A, in accordance with one embodiment of the present disclosure. As shown, the generated UI 330 can include a label component 331 that is generated based on the object 301 in image 300 of FIG. 3A. Dropdown component 332 corresponds to the component generated based on the object 302 in image 300 of FIG. 3A. The dropdown component 332 can be generated to include template application code associated with providing the dropdown functionality that provides the ability to select one of three options (options 1, 2, 3). Once the application code has been generated for the default actions, that code can be later modified by an application programmer to customize the options based on the requirements of the application. Table component 333 corresponds to the component generated based on the object 303 in image 300 of FIG. 3A. Button component 334 corresponds to the component generated based on the object 304 in image 300 of FIG. 3A.

It should be noted that while the components in FIG. 3C have been depicted in a particular way, in other implementations, the code generated for these components can cause the resulting UI 330 to be displayed differently. For example, while dropdown component 332 depicts three dropdown options, in other implementations more or fewer options can be generated. Similarly, while table component 333 is depicted as a general grid, in other implementations, other table structures can be generated (e.g., a spreadsheet style table, an embedded spreadsheet object, columns and rows of different sizes, etc.).

FIGS. 4-7 are flow diagrams showing various methods for performing automated risk assessment of source code, in accordance with embodiments of the disclosure. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by one or more computing devices executing components of a user interface generator. In one implementation, the methods may be performed by user interface generator 140 of FIG. 1, and/or user interface generator 200 of FIG. 2.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 4:
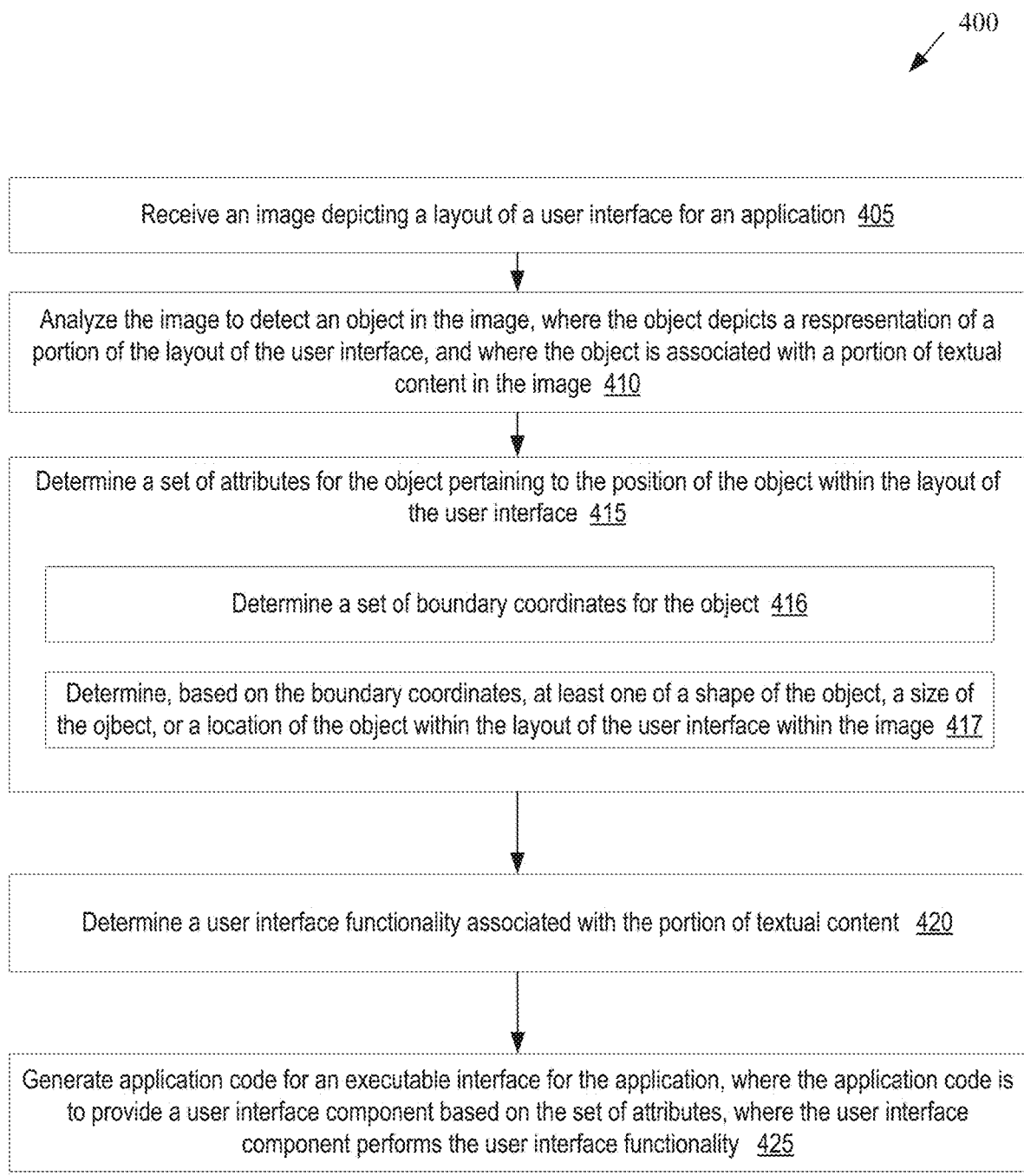
FIG. 4 depicts a flowchart illustrating one embodiment for a method of automated object detection for user interface generation.

FIG. 4 depicts a flowchart illustrating one embodiment for a method 400 of automated object detection for user interface generation. At block 405 of method 400, processing logic receives an image depicting a layout of a user interface for an application. At block 410, processing logic analyzes the image to detect an object in the image, wherein the object depicts a representation of a portion of the layout of the user interface, and wherein the object is associated with a portion of textual content in the image.

At block 415, processing logic determines a set of attributes for the object, the set of attributes pertaining to the position of the object within the layout of the user interface. In some implementations, processing logic makes this determination by first executing block 416, to determine a set of boundary coordinates for the object. Subsequently, block 417 may be invoked, where processing logic determines, based on the boundary coordinates, at least one of a shape of the object, a size of the object, or a location of the object within the layout of the user interface in the image.

At block 420, processing logic determines a user interface functionality associated with the portion of textual content. Illustrative examples of performing this determination are described below with respect to the methods of FIGS. 5A-5B. At block 425, processing logic generates application code for an executable user interface for the application, wherein the application code is to provide a user interface component based on the set of attributes that performs the user interface functionality. In some implementations the application code can be generated as described below with respect to FIG. 6.

Figure 5A:
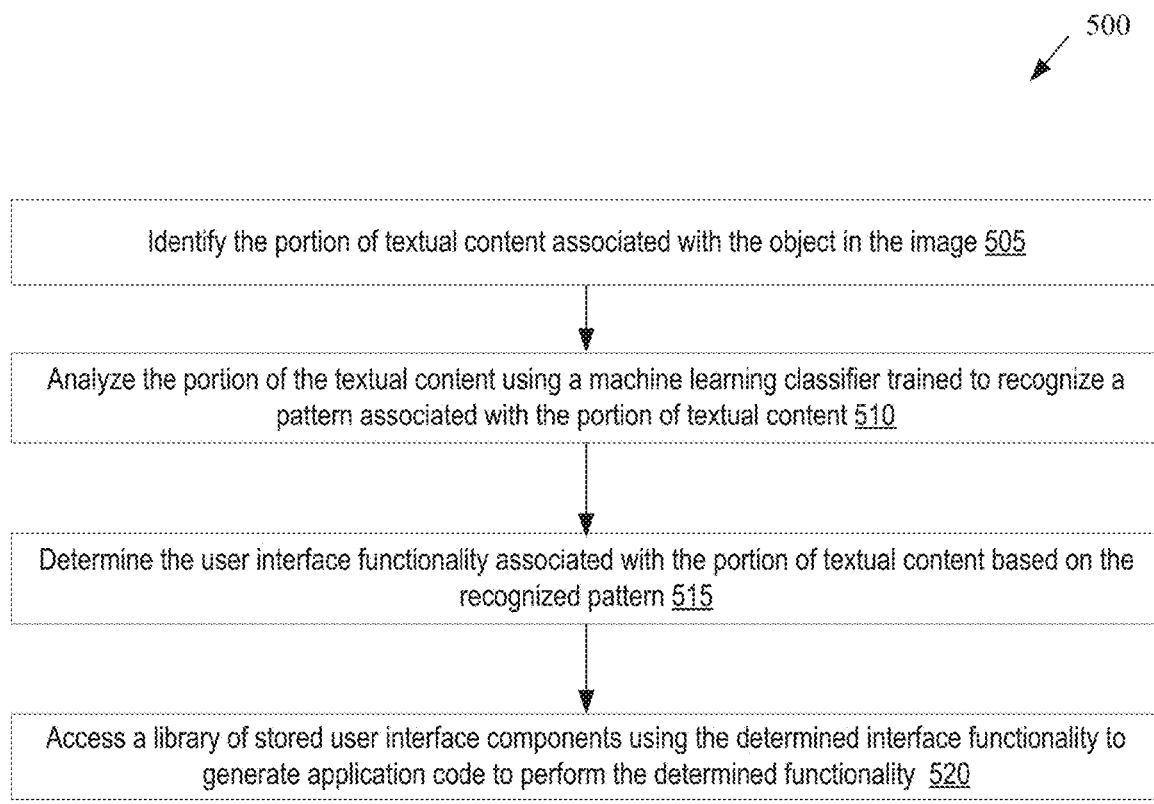
FIG. 5A depicts a flowchart illustrating one embodiment for a method of determining user interface functionality of an object using a machine learning classifier.

FIG. 5A depicts a flowchart illustrating one embodiment for a method 500 of determining user interface functionality of an object using a machine learning classifier. At block 505 of method 500, processing logic identifies the portion of textual content associated with an object in the image. At block 510, processing logic analyzes the portion of textual content associated with the object in the image using a machine learning classifier trained to recognize a pattern associated with the portion of textual content. At block 515, processing logic determines the user interface functionality associated with the portion of textual content based on the recognized pattern. At block 520, processing logic accesses a library of stored user interface components using the user interface functionality to generate application code to perform the determined functionality.

Figure 5B:
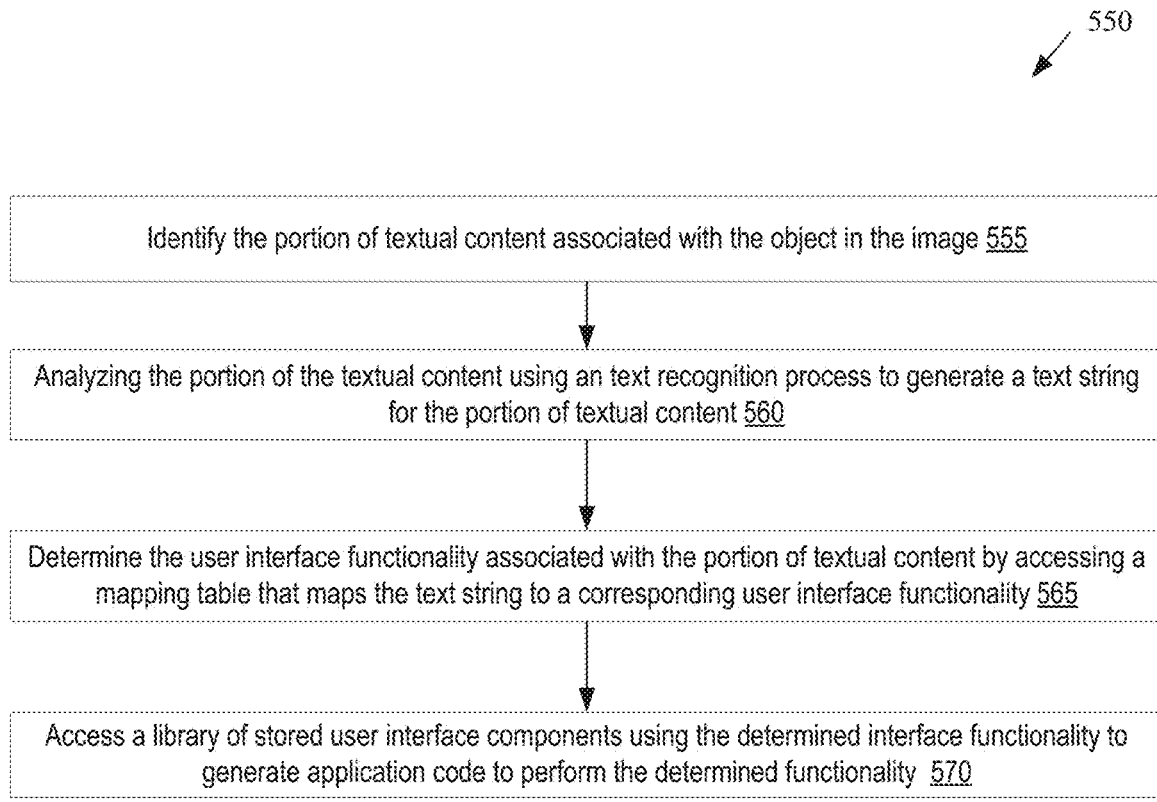
FIG. 5B depicts a flowchart illustrating one embodiment for a method of determining user interface functionality of an object using optical character recognition.

FIG. 5B depicts a flowchart illustrating one embodiment for a method 550 of determining user interface functionality of an object using optical character recognition. At block 555 of method 550, processing logic processing logic identifies the portion of textual content associated with an object in the image. At block 560, processing logic analyzes the portion of textual content associated with the object in the image using a text recognition process to generate a text string for the portion of textual content. In various implementations, the text recognition process can perform an optical character recognition (OCR) operation, execute a model trained to generate text based on the shape of the portion of textual content (e.g., machine learning model, artificial intelligence model, neural network model, deep learning network model, or the like). At block 565, processing logic determines the user interface functionality associated with the portion of textual content by accessing a mapping table that maps the text string to a corresponding user interface functionality. At block 570, processing logic accesses a library of stored user interface components using the user interface functionality to generate application code to perform the determined functionality.

Figure 6:
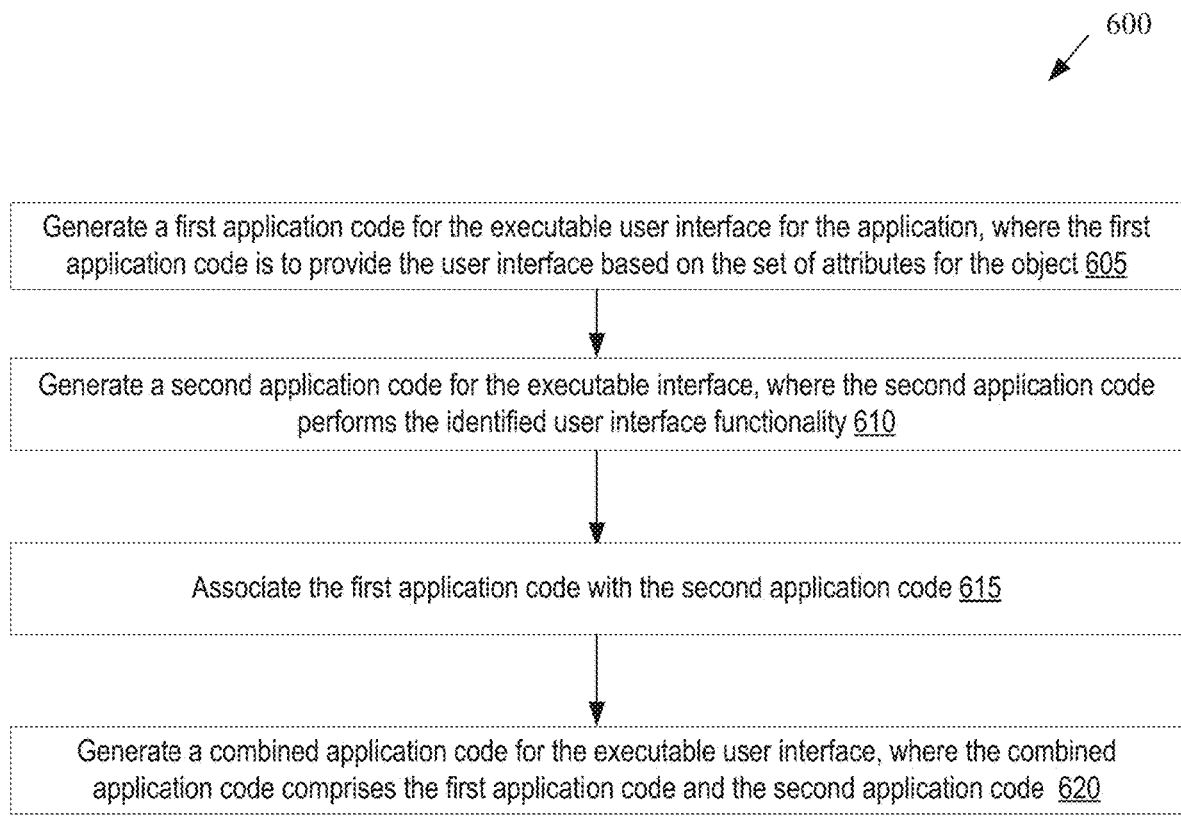
FIG. 6 depicts a flowchart illustrating one embodiment for a method of generating application code for a user interface.

FIG. 6 depicts a flowchart illustrating one embodiment for a method 600 of generating application code for a user interface. At block 605 of method 600, processing logic generates a first application code for the executable user interface for the application, where the first application code is to provide the user interface component within the executable user interface based on the set of attributes for the object. At block 610, processing logic generates a second application code for the executable user interface, where the second application code performs the identified user interface functionality. At block 615, processing logic associates the first application code with the second application code. At block 620, processing logic generates a combined application code for the executable user interface for the application, the combined application code comprising the first application code and the second application code.

Figure 7:
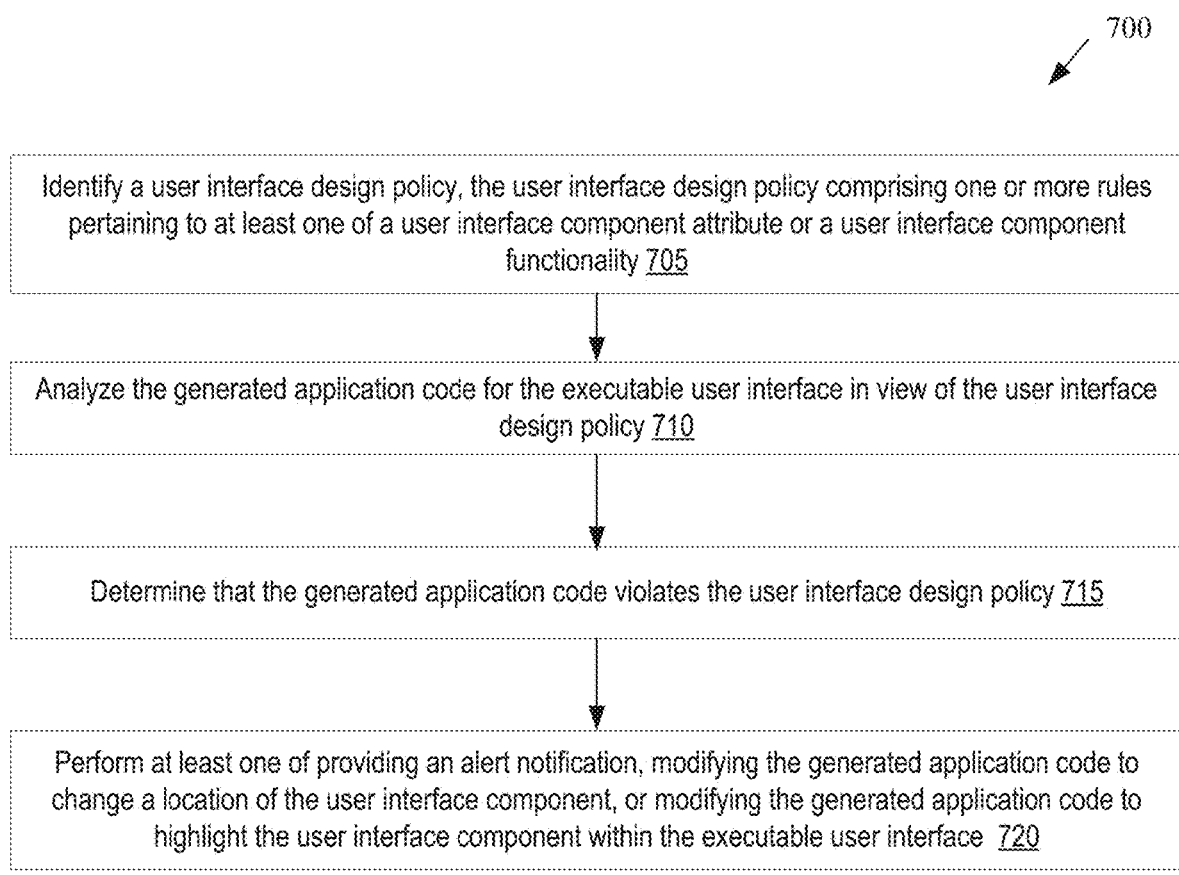
FIG. 7 depicts a flowchart illustrating one embodiment for a method of analyzing generated code based on a user interface design policy.

FIG. 7 depicts a flowchart illustrating one embodiment for a method 700 of analyzing generated code based on a user interface design policy. At block 705 of method 700, processing logic identifies a user interface design policy, the user interface design policy comprising one or more rules pertaining to at least one of a user interface component attribute or a user interface component functionality. At block 710, processing logic analyzes the generated application code for the executable user interface in view of the user interface design policy. At block 715, processing logic determines that the generated application code violates the user interface design policy. At block 720, processing logic performs at least one of providing an alert notification, modifying the generated application code to change a location of the user interface component, or modifying the generated application code to highlight the user interface component within the executable user interface.

Figure 8:
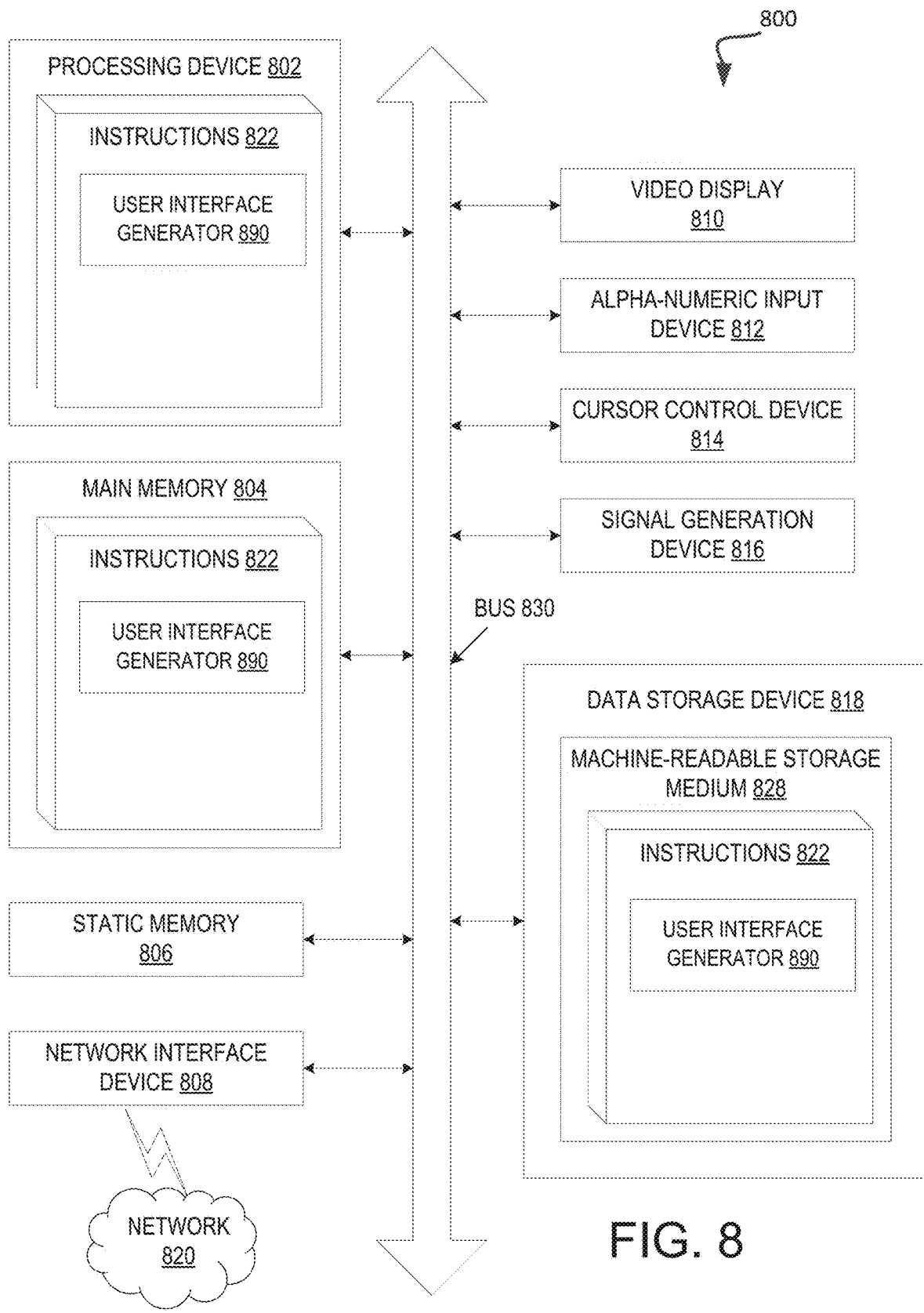
FIG. 8 is a schematic block diagram that provides one example illustration of a computing device executing one or more components of a user interface generator, according to one embodiment of the present disclosure.

FIG. 8 illustrates a diagrammatic representation of a machine in the exemplary form of a computer system (computing device) 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes one or more processing devices (e.g., a processor) 802 operatively coupled to one or more a main memory devices 804 (e.g., read-only memory (ROM), flash memory, dynamic random access memory (DRAM) such as synchronous DRAM (SDRAM)), a static memory device 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions for one or more components 890 of a user interface generator for performing the operations discussed herein.

The computer system 800 may further include a network interface device 808. The computer system 900 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 on which is stored one or more sets of instructions of components 890 for the user interface generator embodying any one or more of the methodologies or functions described herein. The instructions may also reside, completely or at least partially, within the main memory 804 and/or within processing logic of the processing device 802 during execution thereof by the computer system 800, the main memory 804 and the processing device 802 also constituting computer-readable media.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions using terms such as "receiving", "analyzing", "determining", "generating", identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Accordingly, it will be appreciated that a variety of programming languages, specification languages and/or verification tools may be used to implement the teachings of the embodiments of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving an image depicting a layout of a user interface for an application;
   analyzing the image to detect one or more objects in the image, wherein each object of the one or more objects depicts a representation of a portion of the layout of the user interface;
   identifying a first object of the one or more objects in the image;
   determining a set of attributes for the first object, the set of attributes pertaining to a position of the first object within the layout of the user interface;
   generating a first application code for an executable user interface for the application, wherein the first application code is to provide a first user interface component within the executable user interface based on the set of attributes for the first object;
   identifying textual content in the image, wherein the textual content is associated with the first object;
   determining a user interface functionality associated with the textual content;
   retrieving template application code for the executable user interface, wherein the template application code performs the user interface functionality;
   associating the first application code with the template application code;
   generating a combined application code for the executable user interface for the application, the combined application code comprising the first application code and the template application code;
   determining the combined application code violates one or more rules of a user interface design policy; and
   in response to determining a violation of the one or more rules, modifying the combined application code to change a location of a user interface component.

2. The method of claim 1, wherein determining the set of attributes comprises:
   determining a set of boundary coordinates for the first object;

determining, based on the set of boundary coordinates, at least one of a shape of the first object, a size of the first object, or a location of the first object within the layout of the user interface in the image; and generating the first application code to provide the first user interface component using the at least one of the shape of the first object, the size of the first object, or the location of the first object.

3. The method of claim 1, further comprising:

analyzing the textual content in the image using a machine learning classifier trained to recognize a pattern associated with the textual content;

determining the user interface functionality associated with the textual content based on the recognized pattern; and accessing a library of stored user interface components using the user interface functionality to retrieve the template application code.

4. The method of claim 1, further comprising:

analyzing the textual content in the image using a text recognition process to generate a text string for the textual content;

determining the user interface functionality associated with the textual content by accessing a mapping table that maps the text string to a corresponding user interface functionality; and accessing a library of stored user interface components using the user interface functionality to retrieve the template application code.

5. The method of claim 1, further comprising:

determining a unique identifier for the combined application code; and storing the combined application code in a data store, wherein the combined application code is associated with the unique identifier.

6. A method comprising:

receiving an image depicting a layout of a user interface for an application;

analyzing the image to detect an object in the image, wherein the object depicts a representation of a portion of the layout of the user interface, and wherein the object is associated with a portion of textual content in the image;

determining a set of attributes for the object, the set of attributes pertaining to a position of the object within the layout of the user interface;

generating a first application code for an executable user interface for the application, wherein the first application code is to provide a first user interface component within the executable user interface based on the set of attributes for the object;

determining a user interface functionality associated with the portion of textual content;

retrieving template application code for the executable user interface, wherein the template application code performs the user interface functionality;

generating a combined application code comprising the first application code and the template application code for an executable user interface for the application;

determining the combined application code violates one or more rules of a user interface design policy; and in response to determining a violation of the one or more rules, modifying the combined application code to change a location of a user interface component.

7. The method of claim 6, further comprising:

associating the first application code with the template application code.

8. The method of claim 6, further comprising:

determining a set of boundary coordinates for the object;

determining, based on the set of boundary coordinates, at least one of a shape of the object, a size of the object, or a location of the object within the layout of the user interface in the image; and generating the first application code to provide the user interface component using the at least one of the shape of the object, the size of the object, or the location of the object.

9. The method of claim 8, further comprising:

determining a set of horizontal coordinates for the object;

determining a set of vertical coordinates for the object; and determining the boundary coordinates based on the set of horizontal coordinates and the set of vertical coordinates.

10. The method of claim 6, further comprising:

determining a color associated with the object in the image; and setting a color attribute for the user interface component based on the color.

11. The method of claim 6, further comprising:

analyzing the portion of textual content associated with the object in the image using a machine learning classifier trained to recognize a pattern associated with the portion of textual content;

determining the user interface functionality associated with the portion of textual content based on the pattern; and accessing a library of stored user interface components using the user interface functionality to retrieve the template application code.

12. The method of claim 6, further comprising:

analyzing the portion of textual content associated with the object in the image a text recognition process to generate a text string for the portion of textual content;

determining the user interface functionality associated with the portion of textual content by accessing a mapping table that maps the text string to a corresponding user interface functionality; and accessing a library of stored user interface components using the user interface functionality to retrieve the template application code.

13. The method of claim 6, further comprising:

determining a unique identifier for the combined application code; and storing the combined application code in a data store, wherein the combined application code is associated with the unique identifier.

14. The method of claim 6, wherein the image is received from a client device, the method further comprising:

providing the combined application code to the client device.

15. The method of claim 6, further comprising:

identifying the user interface design policy, the user interface design policy comprising the one or more rules pertaining to at least one of a user interface component attribute or a user interface component functionality; and providing an alert notification.

16. A system comprising:

one or more memory devices; and one or more processing devices, wherein the one or more processing devices is operatively coupled to at least one of the one or more memory devices, wherein the one or more processing devices are configured to:

receive an image depicting a layout of a user interface for an application;

analyze the image to detect an object in the image, wherein the object depicts a representation of a portion of the layout of the user interface, and wherein the object is associated with a portion of textual content in the image;

determine a set of attributes for the object, the set of attributes pertaining to a position of the object within the layout of the user interface;

generate a first application code for an executable user interface for the application, wherein the first application code is to provide a first user interface component within the executable user interface based on the set of attributes for the object;

determine a user interface functionality associated with the portion of textual content;

retrieve template application code for the executable user interface, wherein the template application code performs the user interface functionality;

generate a combined application code comprising the first application code and the template application code for an executable user interface for the application;

determining the combined application code violates one or more rules of a user interface design policy; and in response to determining a violation of the one or more rules, modifying the combined application code to change a location of a user interface component.

17. The system of claim 16, wherein the one or more processing devices are further to:

associate the first application code with the template application code.

18. The system of claim 16, wherein the one or more processing devices are further to:

determine a set of boundary coordinates for the object;

determine, based on the set of boundary coordinates, at least one of a shape of the object, a size of the object, or a location of the object within the layout of the user interface in the image; and generate the first application code to provide the user interface component using the at least one of the shape of the object, the size of the object, or the location of the object.

19. The system of claim 16, wherein the one or more processing devices are further to:

analyze the portion of textual content associated with the object in the image using a machine learning classifier trained to recognize a pattern associated with the portion of textual content;

determine the user interface functionality associated with the portion of textual content based on the pattern; and access a library of stored user interface components using the user interface functionality to retrieve the template application code.

20. The system of claim 16, wherein the one or more processing devices are further to:

analyze the portion of textual content associated with the object in the image using a machine learning classifier trained to recognize a pattern associated with the portion of textual content;

determine the user interface functionality associated with the portion of textual content based on the pattern; and access a library of stored user interface components using the user interface functionality to retrieve the template application code.

\* \* \* \* \*